US012112714B2

(12) United States Patent

Akiba et al.

(10) Patent No.: US 12,112,714 B2
(45) Date of Patent: Oct. 8, 2024

(54) CIRCUIT DEVICE AND DISPLAY SYSTEM

(71) Applicant: SEIKO EPSON CORPORATION, Tokyo (JP)

(72) Inventors: Yasutoshi Akiba, Chino (JP); Kumar Anandabairavasamy Anand, Richmond (CA); Sebdani Mahmood Mazrouei, Markham (CA); Tyler Dahlman, Richmond (CA)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/349,747

(22) Filed: Jul. 10, 2023

(65) Prior Publication Data

US 2024/0013739 A1 Jan. 11, 2024

(30) Foreign Application Priority Data

Jul. 11, 2022 (JP) ................................ 2022-111037

(51) Int. Cl.
*G09G 3/34* (2006.01)

(52) U.S. Cl.
CPC ....... *G09G 3/3426* (2013.01); *G09G 2310/08* (2013.01); *G09G 2320/0242* (2013.01); *G09G 2320/0646* (2013.01); *G09G 2360/16* (2013.01)

(58) Field of Classification Search
CPC ......... G09G 3/3426; G09G 2320/0242; G09G 2320/0646; G09G 2360/16
See application file for complete search history.

(56) References Cited

U.S. PATENT DOCUMENTS 8,390,656 B2 * 3/2013 Muroi .................. G09G 3/3413 345/102
8,605,017 B2 * 12/2013 Brown Elliott ...... G09G 3/3426 345/694
9,390,660 B2 * 7/2016 Johnson ............... G09G 3/2048
11,475,865 B2 * 10/2022 Chappalli ............ G09G 3/3426
2009/0174638 A1 * 7/2009 Brown Elliott ...... G09G 3/2081 345/88
2011/0273495 A1 * 11/2011 Ward .................. G09G 3/3413 345/694
2022/0319402 A1 * 10/2022 Furukawa ............... G09G 3/32

FOREIGN PATENT DOCUMENTS

JP 2021-009170 A 1/2021

* cited by examiner

*Primary Examiner* — Gene W Lee
(74) *Attorney, Agent, or Firm* — Harness, Dickey & Pierce, P.L.C.

(57) ABSTRACT

A circuit device includes a luminance analysis circuit, a luminance information calculation circuit, and a color correction circuit. The luminance analysis circuit executes luminance analysis on image data, and obtains dimming information for local dimming control based on a result of the luminance analysis. The luminance information calculation circuit calculates, based on the dimming information on n×m light source elements, luminance information indicating a luminance of light reaching a target pixel from the n×m light source elements. Among the plurality of light source elements of the backlight, the n×m light source elements are arranged around the target pixel for color correction in the local dimming control. The color correction circuit executes color correction on image data on the target pixel based on the luminance information, and outputs the image data after the color correction to the display device.

12 Claims, 10 Drawing Sheets

FIG. 8

| SQUARE OF DISTANCE | ATTENUATION RATE |
|---|---|
| 0 | 1 |
| 1 | 1 |
| 4 | 0.95 |
| 9 | 0.85 |
| 16 | 0.7 |
| 25 | 0.5 |
| 36 | 0.3 |
| 49 | 0.2 |
| 64 | 0.1 |
| 81 | 0.05 |
| 100 | 0.02 |

FIG. 9

| DISTANCE IN VERTICAL DIRECTION | | DISTANCE IN HORIZONTAL DIRECTION | | | | | | | | | | |
|---|---|---|---|---|---|---|---|---|---|---|---|---|
| | | −5 | −4 | −3 | −2 | −1 | 0 | 1 | 2 | 3 | 4 | 5 |
| | −5 | 0.01 | 0.02 | 0.05 | 0.05 | 0.05 | 0.05 | 0.05 | 0.05 | 0.05 | 0.02 | 0.01 |
| | −4 | 0.02 | 0.05 | 0.1 | 0.3 | 0.3 | 0.3 | 0.3 | 0.3 | 0.1 | 0.05 | 0.02 |
| | −3 | 0.05 | 0.1 | 0.3 | 0.5 | 0.6 | 0.6 | 0.6 | 0.5 | 0.3 | 0.1 | 0.05 |
| | −2 | 0.05 | 0.3 | 0.5 | 0.6 | 0.8 | 0.8 | 0.8 | 0.6 | 0.5 | 0.3 | 0.05 |
| | −1 | 0.05 | 0.3 | 0.6 | 0.8 | 0.95 | 1 | 0.95 | 0.8 | 0.6 | 0.3 | 0.05 |
| | 0 | 0.05 | 0.3 | 0.6 | 0.8 | 1 | 1 | 1 | 0.8 | 0.6 | 0.3 | 0.05 |
| | 1 | 0.05 | 0.3 | 0.6 | 0.8 | 0.95 | 1 | 0.95 | 0.8 | 0.6 | 0.3 | 0.05 |
| | 2 | 0.05 | 0.3 | 0.5 | 0.6 | 0.8 | 0.8 | 0.8 | 0.8 | 0.5 | 0.3 | 0.05 |
| | 3 | 0.05 | 0.1 | 0.3 | 0.5 | 0.6 | 0.6 | 0.6 | 0.5 | 0.3 | 0.1 | 0.05 |
| | 4 | 0.02 | 0.05 | 0.1 | 0.3 | 0.3 | 0.3 | 0.3 | 0.3 | 0.1 | 0.05 | 0.02 |
| | 5 | 0.01 | 0.02 | 0.05 | 0.05 | 0.05 | 0.05 | 0.05 | 0.05 | 0.05 | 0.02 | 0.01 |

CIRCUIT DEVICE AND DISPLAY SYSTEM

The present application is based on, and claims priority from JP Application Serial Number 2022-111037, filed on Jul. 11, 2022, the disclosure of which is hereby incorporated by reference herein in its entirety.

BACKGROUND

1. Technical Field

The present disclosure relates to a circuit device, a display system, and the like.

2. Related Art

JP-A-2021-009170 discloses a display device that executes local dimming control on a backlight. The backlight includes a plurality of light sources, and is divided into a plurality of control areas where emission intensities can be changed independently of one another. The display device includes a backlight emission intensity determination unit, a backlight control unit, a luminance distribution calculation unit, and an image data correction unit. The backlight emission intensity determination unit determines an emission intensity of a light source for each control area based on input image data, and generates emission intensity data indicating the emission intensity. The backlight control unit outputs a drive signal to each of the plurality of light sources based on the emission intensity data. The luminance distribution calculation unit calculates a luminance distribution on a display panel based on the emission intensity data. The image data correction unit corrects the input image data based on the luminance distribution on the display panel to generate the image data after correction.

JP-A-2021-009170 discloses that "the luminance distribution calculation unit calculates a luminance distribution on a display panel based on the emission intensity data". However, JP-A-2021-009170 does not disclose or suggest which light source among the plurality of light sources arranged in the backlight is used to calculate the luminance distribution on the display panel when calculating the luminance distribution. For example, when all of the plurality of light sources arranged in the backlight are used to calculate the luminance distribution, a processing load for calculating the luminance distribution is very large.

SUMMARY

An aspect of the present disclosure relates to a circuit device that executes local dimming control on a display device including a display panel and a backlight having a plurality of two-dimensionally arranged light source elements, and the circuit device includes: a luminance analysis circuit configured to execute luminance analysis on image data and obtain dimming information for the local dimming control based on a result of the luminance analysis; a luminance information calculation circuit configured to calculate, based on the dimming information on n×m light source elements arranged around a target pixel for color correction in the local dimming control among the plurality of light source elements, each of n and m being an integer of two or more and eight or less, luminance information indicating a luminance of light reaching the target pixel from the n×m light source elements; and a color correction circuit configured to execute color correction on image data on the target pixel based on the luminance information and output the image data after the color correction to the display device.

Another aspect of the present disclosure relates to a display system including the circuit device and the display device described above.

BRIEF DESCRIPTION OF THE DRAWINGS

FIG. 8 is an example of a one-dimensional attenuation rate table.

FIG. 9 is an example of a two-dimensional attenuation rate table.

DESCRIPTION OF EXEMPLARY EMBODIMENTS

Hereinafter, preferred embodiments of the present disclosure will be described in detail. The embodiments to be described below do not unduly limit contents described in the claims, and not all configurations described in the embodiments are necessarily essential components.

1. Electronic Apparatus, Display System, and Circuit Device

Figure 1:
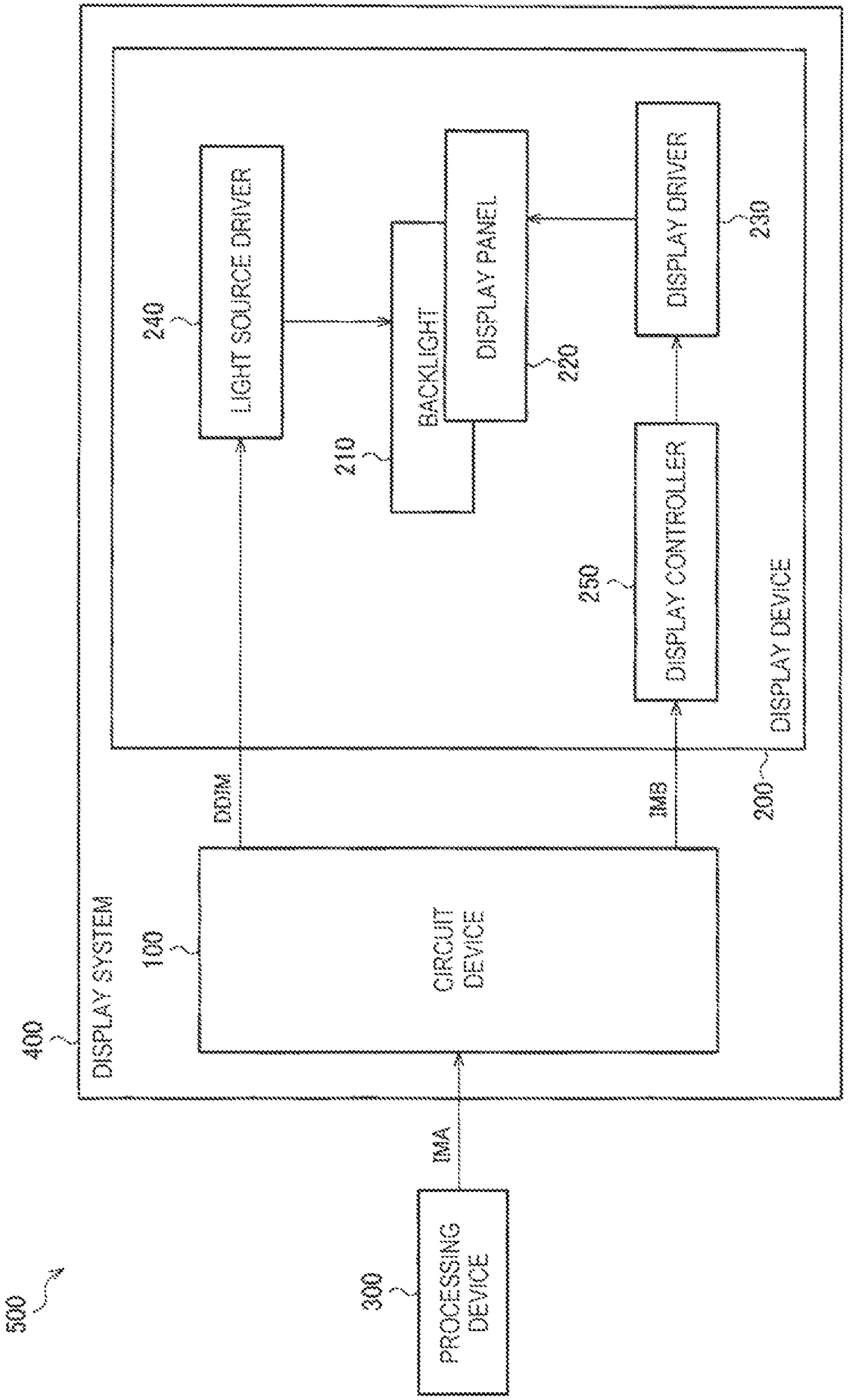
FIG. 1 is a configuration example of an electronic apparatus including a display system according to an embodiment.

FIG. 1 is a configuration example of an electronic apparatus including a display system according to an embodiment. An electronic apparatus 500 includes a processing device 300 and a display system 400. The electronic apparatus 500 is, for example, an in-vehicle cluster panel including a display, an in-vehicle display apparatus including a head-up display, a television device, or an information processing device including a display.

The display system 400 includes a circuit device 100 and a display device 200. The circuit device 100 is, for example, an integrated circuit device in which a plurality of circuit elements are integrated on a semiconductor substrate. Although the circuit device 100 and the display device 200 are shown as separate components in FIG. 1, the circuit device 100 may be included in the display device 200.

The display device 200 includes a backlight 210, a display panel 220, a display driver 230, a light source driver 240, and a display controller 250. An example of the display device 200 is a display used for a television device, an information processing device, or the like. Alternatively, the display device 200 may be a head-mounted display including an eye projection device, a head-up display including a screen projection device, or the like. When the display device 200 is a head-up display, the display device 200 further includes an optical system for projecting light emitted from the backlight 210 and transmitted through the display panel 220 onto a screen.

In a plan view of the backlight 210, the backlight 210 includes light source elements arranged two-dimensionally. The light source element is a light-emitting element that emits light by power supply, such as an inorganic light-emitting diode or an organic light-emitting diode. In local dimming control, light amounts of the two-dimensionally arranged light source elements are independently controlled. Alternatively, the backlight may be divided into a plurality of areas each including a plurality of light source elements in the plan view, the light source elements included in each area may be controlled to have the same light amount, and a light amount of each area may be independently controlled.

An example of a two-dimensional arrangement of the light source elements is a square arrangement in which the light source elements are arranged at all intersections of a plurality of rows and a plurality of columns. However, the two-dimensional arrangement is not limited to the square arrangement. For example, the two-dimensional arrangement may be an arrangement called a rhombus arrangement or a staggered arrangement. In this arrangement, the light source elements are arranged at intersections of one of odd and even rows and odd columns and intersections of the other of the odd and even rows and even columns, and no light source elements are arranged at other intersections.

The light source driver 240 receives dimming data DDIM from the circuit device 100, and drives each light source element of the backlight 210 based on the dimming data DDIM. The light source driver 240 is, for example, an integrated circuit device. A plurality of light source drivers may be provided, and each of the light source drivers may be a separate integrated circuit device.

The display panel 220 is an electro-optical panel that transmits light from the backlight 210 and displays an image by controlling the transmittance. For example, the display panel 220 is a liquid crystal display panel.

The display controller 250 receives image data IMB from the circuit device 100, and transmits the image data IMB and a timing control signal for controlling a display timing to the display driver 230. The display controller 250 may execute image processing such as gradation correction, white balance correction, scaling, or the like on the received image data IMB.

The display driver 230 displays an image on the display panel 220 by driving the display panel based on the received image data and the timing control signal. The display controller 250 and the display driver 230 may be implemented by separate integrated circuit devices, or may be implemented by a single integrated circuit device.

The processing device 300 transmits image data IMA to the circuit device 100. The processing device 300 is a processor such as a CPU, a microcomputer, a DSP, an ASIC, or an FPGA.

The circuit device 100 receives the image data IMA and executes local dimming control on the display device 200 based on the image data IMA. The circuit device 100 determines an emission luminance of each light source element or each area of the backlight 210 as dimming information by executing luminance analysis on the image data IMA, and outputs the dimming data DDIM indicating the dimming information to the light source driver 240. The circuit device 100 executes color correction on the image data IMA based on the dimming information, and outputs the image data IMB after the color correction to the display controller 250.

Figure 2:
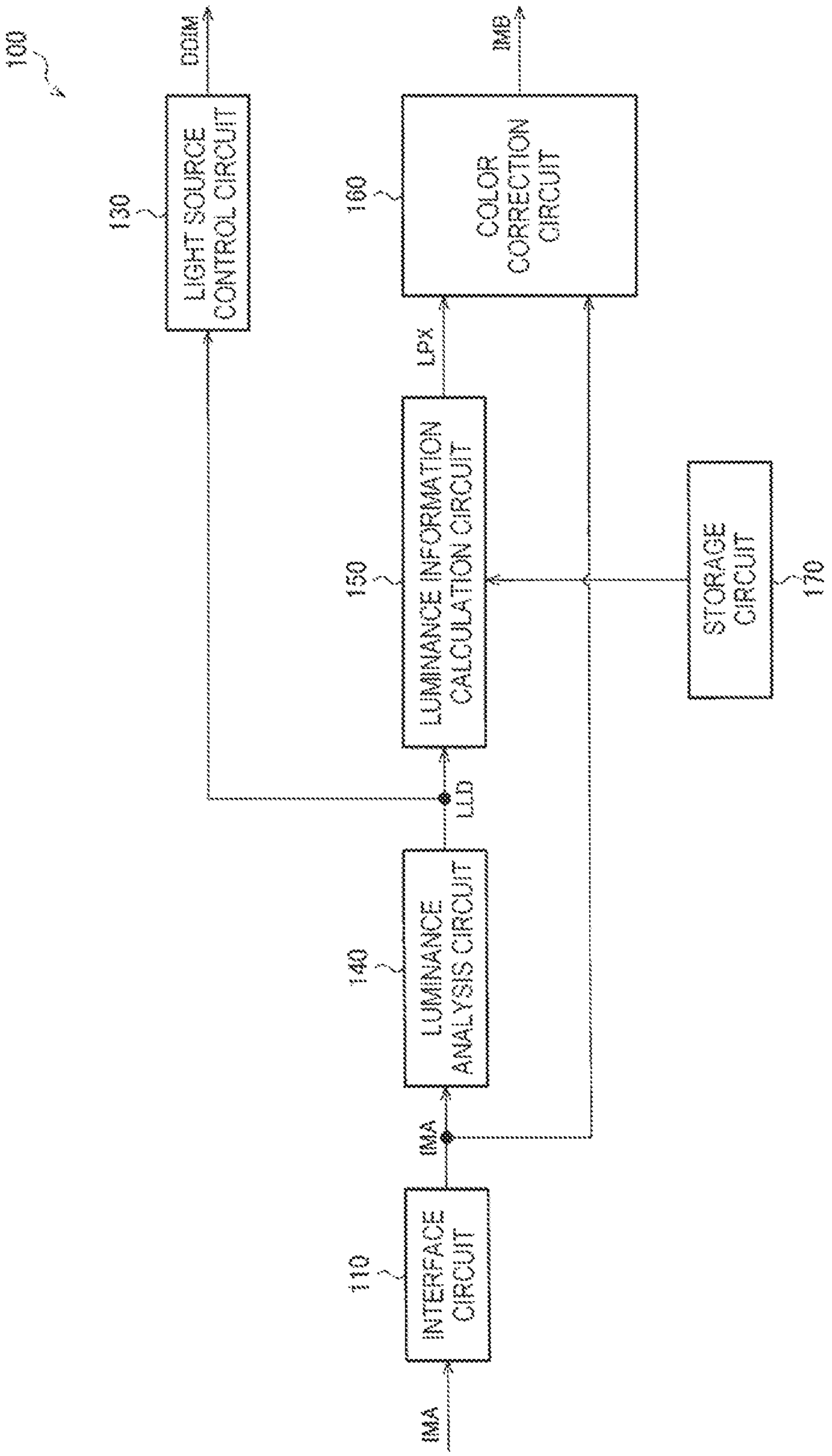
FIG. 2 is a detailed configuration example of a circuit device.

FIG. 2 is a detailed configuration example of the circuit device. The circuit device 100 includes an interface circuit 110, a light source control circuit 130, a luminance analysis circuit 140, a luminance information calculation circuit 150, a color correction circuit 160, and a storage circuit 170. Hereinafter, a case where each light source element of the backlight 210 is independently dimmed in the local dimming will be described as an example, but each area may be independently dimmed.

The interface circuit 110 receives the image data IMA from the processing device 300. The interface circuit 110 may be an interface circuit for various image interface systems such as an LVDS, a parallel RGB system, or a display port.

The luminance analysis circuit 140 executes luminance analysis on the image data IMB, determines an emission luminance of each light source element based on the analysis result, and outputs dimming data LLD indicating the emission luminance of each light source element as dimming information to the light source control circuit 130 and the luminance information calculation circuit 150. For example, the luminance analysis circuit 140 determines a maximum luminance of pixel data belonging to an image area corresponding to a light source element of the backlight 210 in the image area, determines a minimum backlight emission luminance within a range in which the maximum luminance can be displayed on the display device 200, and sets the minimum backlight emission luminance as an emission luminance of the light source element.

The light source control circuit 130 outputs the dimming data DDIM indicating an emission luminance of each light source element to the light source driver 240 based on the dimming data LLD indicating the emission luminance of each light source element. The light source driver 240 drives each light source element with a PWM signal having a pulse width corresponding to the emission luminance of each light source element indicated by the dimming data DDIM. Accordingly, each light source element emits light with the emission luminance controlled by the local dimming.

The luminance information calculation circuit 150 obtains luminance information indicating a luminance of light reaching each pixel of the display panel 220 from the backlight 210 based on the emission luminance of each light source element indicated by the dimming data LLD, and outputs the luminance information as illumination luminance data LPX to the color correction circuit 160. The luminance information calculation circuit 150 sets a pixel whose luminance information is to be obtained as a target pixel, and obtains, using a calculation equation or a table, a luminance of light reaching the target pixel from a predetermined number of light source elements arranged around the target pixel. Details of this point will be described later.

The storage circuit 170 stores attenuation information used for obtaining the luminance information. The luminance information calculation circuit 150 obtains the luminance information based on the attenuation information stored in the storage circuit 170. The attenuation information is an attenuation characteristic indicating a relationship between a distance from a light source element to a pixel and an attenuation rate of light reaching the pixel from the light source element. This characteristic is also called luminance distribution. When the luminance information is obtained by a calculation equation, the storage circuit 170 stores the calculation equation or coefficients in the calculation equation. When the luminance information is obtained as a table, the storage circuit 170 stores the table. The storage circuit 170 may be a register or a memory such as a RAM or a nonvolatile memory.

The color correction circuit 160 executes color correction on the image data IMA based on the illumination luminance data LPX, and outputs the image data IMB after the correction to the display driver 230. Specifically, the color correction circuit 160 multiplies pixel data on each pixel by a reciprocal of a luminance of light reaching the pixel, and sets the result as new pixel data on the pixel.

The light source control circuit 130, the luminance analysis circuit 140, the luminance information calculation circuit 150, and the color correction circuit 160 are logic circuits that process digital signals. Each of the light source control circuit 130, the luminance analysis circuit 140, the luminance information calculation circuit 150, and the color correction circuit 160 may be separately implemented by a logic circuit, or some or all of the circuits may be implemented by an integrated logic circuit. Alternatively, a processor such as a DSP may implement functions of the light source control circuit 130, the luminance analysis circuit 140, the luminance information calculation circuit 150, and the color correction circuit 160 by executing an instruction set or programs describing the functions.

2. First Embodiment

Figure 3:
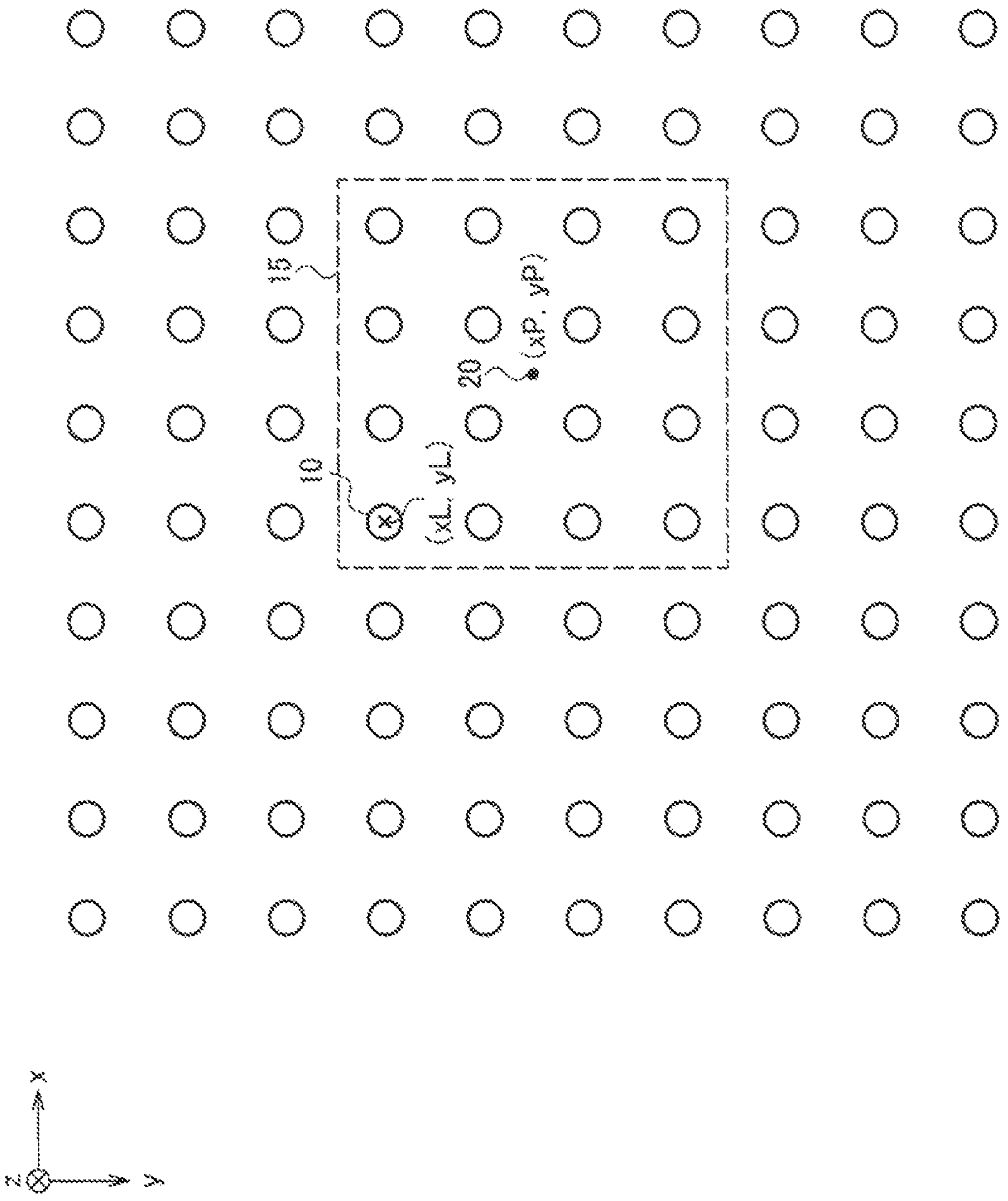
FIG. 3 is a diagram showing a method of selecting light source elements when luminance information is to be obtained.

FIG. 3 is a diagram showing a method of selecting light source elements when luminance information is to be obtained. Three directions orthogonal to one another are defined as an x direction, a y direction, and a z direction. The backlight 210 and the display panel 220 are parallel to an xy plane, and the backlight 210 is provided on a z direction side of the display panel 220. The x direction is a horizontal direction of the display panel 220, and the y direction is a vertical direction of the display panel 220. Here, an example in which a plurality of light source elements 10 are arranged in a square in the backlight 210 is shown.

A pixel whose luminance information is to be obtained by the luminance information calculation circuit 150 is a target pixel 20, and the xy coordinates thereof are (xP, yP). The luminance information calculation circuit 150 obtains luminance information on each pixel of the display panel 220 by obtaining the luminance information while sequentially shifting the target pixel 20.

The xy coordinates of the light source element 10 are (xL, yL). When the display panel 220 and the backlight 210 are viewed in a plan view in the z direction and each light source is regarded as a point light source, coordinates on the display panel 220 corresponding to the point light source are (xL, yL).

The luminance information calculation circuit 150 selects n×m light source elements around the target pixel 20. When the light source elements are arranged in the square, n×m means n rows and m columns. FIG. 3 shows an example of n=m=4, but each of n and m may be an integer of two or more and eight or less. Specifically, the luminance information calculation circuit 150 selects a column with the smallest |xL−xP| and a column with the second smallest |xL−xP| when xL≤xP, and selects a column with the smallest |xL−xP| and a column with the second smallest |xL−xP| when xP<xL. The luminance information calculation circuit 150 selects a row with the smallest |yL−yP| and a row with the second smallest |yL−yP| when yL≤yP, and selects a row with the smallest |yL−yP| and a row with the second smallest |xL−xP| when yP<yL. Then, the luminance information calculation circuit 150 selects 4×4 light source elements 10 existing at intersections of the selected four columns and four rows as a light source element group 15 for obtaining the luminance information on the target pixel 20.

Figure 4:
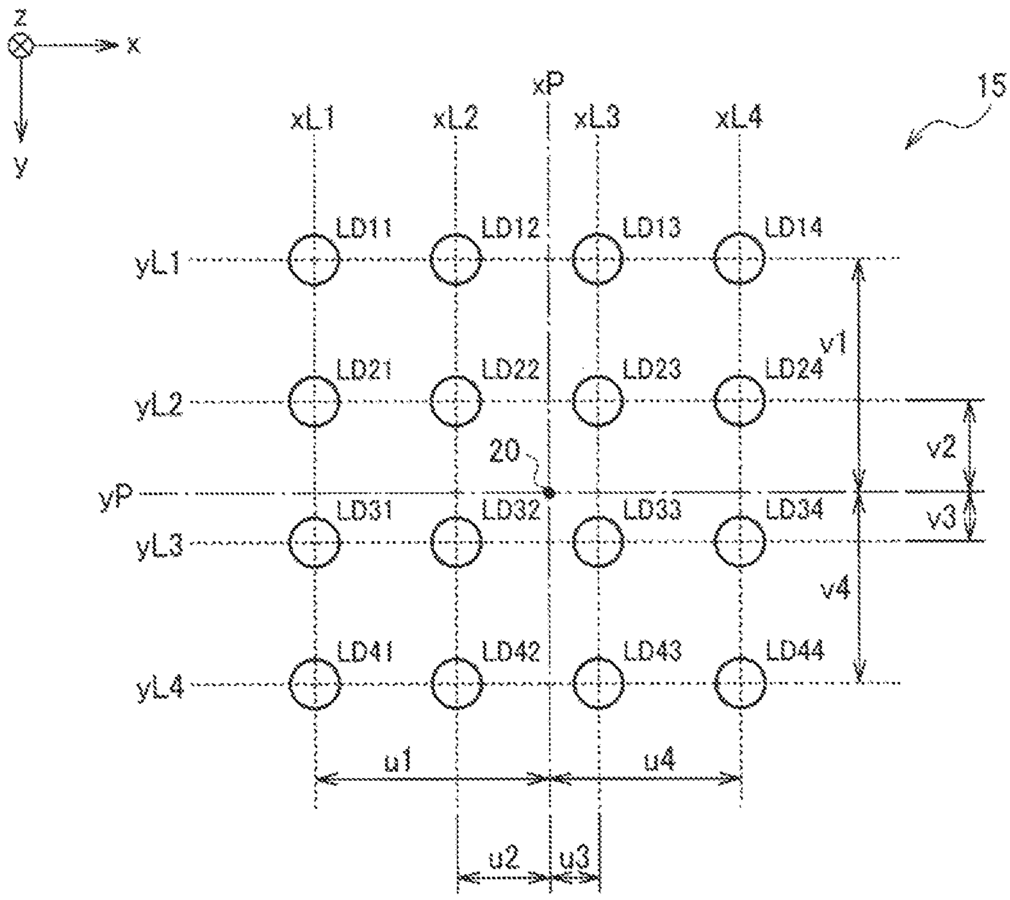
FIG. 4 is a diagram showing a distance between a target pixel and each light source element.

FIG. 4 is a diagram showing a distance between a target pixel and each light source element. Among the 4×4 light source elements belonging to the light source element group 15, the light source element in the i-th row and the j-th column is denoted by LDij. The xy coordinates of the light source element LDij are denoted by (xLj, yLi), in which i is an integer of 1 or more and n=4 or less, and j is an integer of 1 or more and m=4 or less.

The distance is a distance on the xy plane or the display panel 220. The distance may be an actual distance by meter or the like, or a distance defined by a predetermined unit. For example, when the predetermined unit is a pixel pitch of the display panel 220, the distance is indicated by the number of pixels on the display panel 220.

The luminance information calculation circuit 150 obtains distances u1 to u4 between the light source elements and the target pixel 20 in the x direction and distances v1 to v4 between the light source elements and the target pixel 20 in the y direction. In addition, uj is a distance between the light source element in the j-th column and the target pixel 20 in the horizontal direction. Specifically, uj=xLj−xP. In addition, vi is a distance between the light source element in the i-th row and the target pixel 20 in the vertical direction. Specifically, vi=yLi−yP.

The luminance information calculation circuit 150 calculates a luminance PIX_BL of light reaching the target pixel 20 from the 4×4 light source elements belonging to the light source element group 15 by the following equations (1) and (2). Lij is a square of a distance between the light source element LDij and the target pixel 20. LED_BLij is an emission luminance of the light source element LDij determined by the luminance analysis circuit 140. In addition, α(Lij) is a function with Lij as a variable, and indicates an attenuation rate of light reaching the target pixel 20 from the light source element LDij when the square of the distance is Lij.

$$Lij = ui^2 + vi^2 \tag{1}$$

$$\text{PIX\_BL} = \sum_{j=1}^{m} \sum_{i=1}^{n} \text{LED\_BLij} \times \alpha(Lij) \tag{2}$$

Figure 5:
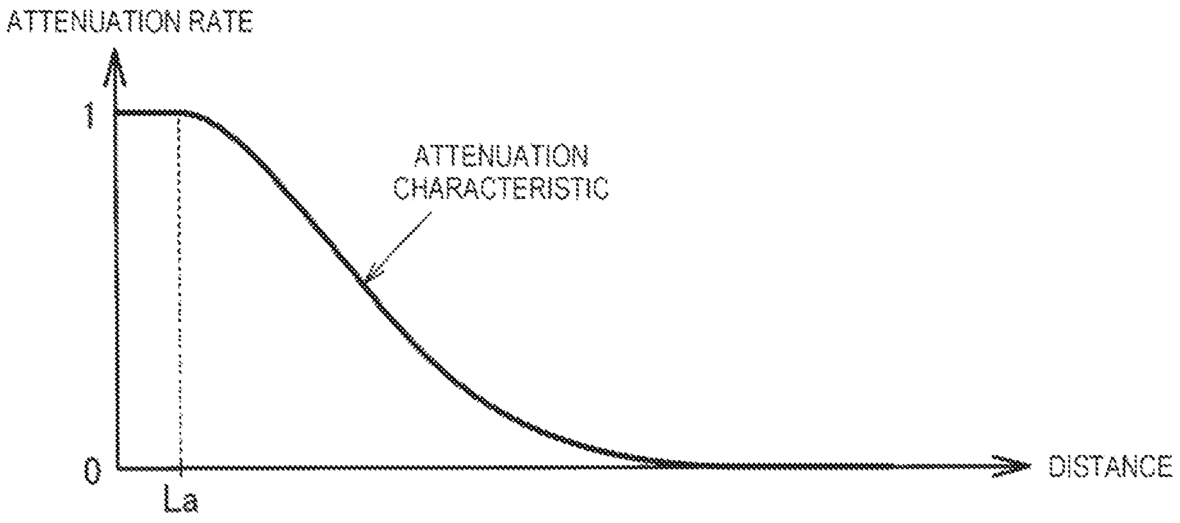
FIG. 5 is an example of an attenuation characteristic.

FIG. 5 shows an example of an attenuation characteristic. Here, a maximum value of an attenuation rate is normalized to 1. A distance of zero means a position directly above the light source element on the display panel 220, and the attenuation rate is constant at 1 from the position to a predetermined distance La. The distance La indicates a size of the light source element in a plan view of the backlight 210. That is, the light source element has the same size as that of a circle having a radius La in the plan view. In calculation of the luminance information, the light source element is used as the point light source, but the luminance information considering an area of the light source element can be obtained using an attenuation characteristic in which a constant attenuation rate is set up to the distance La.

When the distance is longer than the distance La, the attenuation rate monotonically decreases, and gradually approaches zero. At a distance where the attenuation rate can be regarded as substantially zero, light reaching the target pixel from the light source element can be ignored. In the embodiment, the light source element farther than the n×m light source elements around the target pixel 20 is a light source element from which light reaching the target pixel 20 can be ignored. That is, the light source elements from which light reaching the target pixel 20 cannot be ignored are selected as the n×m light source elements. To what extent the attenuation rate is considered negligible depends on accuracy of the luminance information to be obtained. As n and m increase, more distant light sources are taken into consideration, and thus more accurate luminance information can be obtained, while as n and m decrease, less light sources is to be considered, and thus a processing load becomes smaller. Therefore, n and m may be determined according to the accuracy of luminance information and the processing load.

A common attenuation characteristic may be used for the plurality of light source elements provided in the backlight 210, or an attenuation characteristic for each light source element may be used, or an attenuation characteristic may be determined for each area of the backlight 210, and a common attenuation characteristic may be used for light source elements belonging to the same area.

Figure 6:
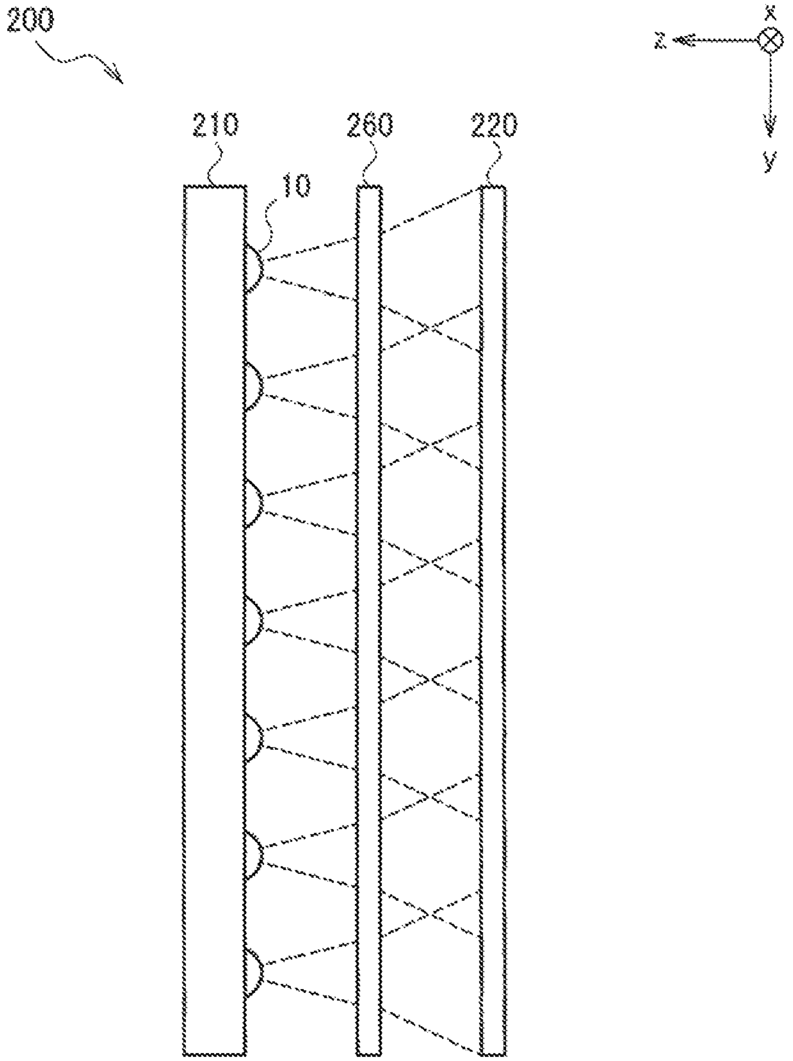
FIG. 6 is a cross-sectional view of a display device in a yz plane.

FIG. 6 is a cross-sectional view of the display device in a yz plane. The display driver 230, the light source driver 240, and the display controller 250 are not shown.

The display device 200 includes a diffusion sheet 260. The diffusion sheet 260 is provided between the backlight 210 and the display panel 220 in a manner of being parallel to the xy plane. The diffusion sheet 260 diffuses light incident from one surface and emits the light from the other surface. Accordingly, light emitted from each light source element 10 of the backlight 210 is diffused by the diffusion sheet 260, and enters the display panel 220 as more diffused light. When the diffusion sheet 260 is provided, the attenuation characteristic in FIG. 5 shows the attenuation rate after being affected by the diffusion sheet 260. That is, the attenuation characteristic is determined based on the attenuation rate of the light emitted from the light source element and a diffusion characteristic of the diffusion sheet 260.

For example, the diffusion characteristic may be acquired by measurement using a luminance sensor, or by simulation using a computer.

Figure 7:
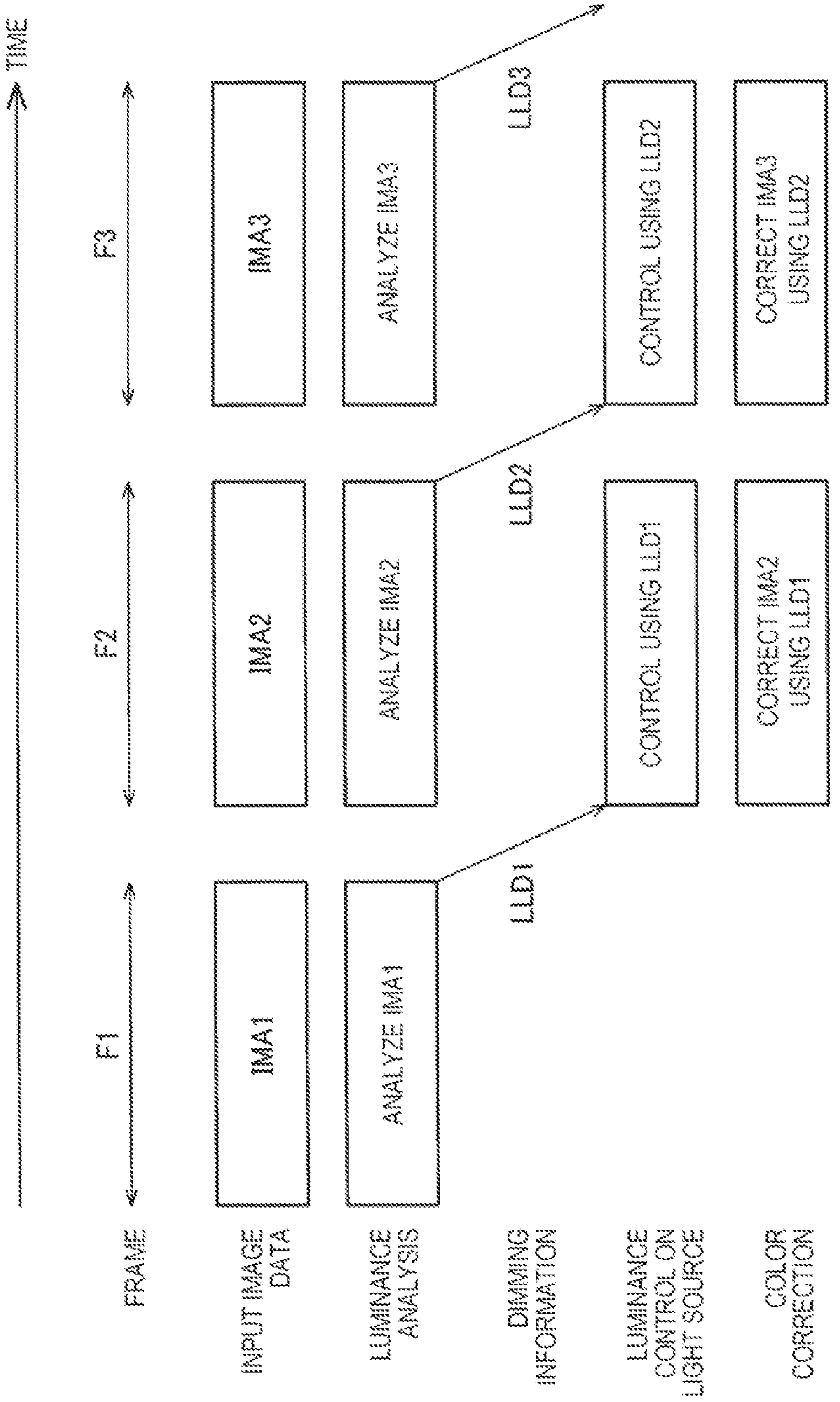
FIG. 7 is a timing chart of processing executed by the circuit device.

FIG. 7 is a timing chart of processing executed by the circuit device. In a first frame F1, the interface circuit 110 receives image data IMA1 on the first frame F1. The luminance analysis circuit 140 buffers the received image data IMA1 into a line buffer, an image memory, or the like, executes luminance analysis on the buffered image data IMA1, and outputs dimming data LLD1.

In a second frame F2, the interface circuit 110 receives image data IMA2 on the second frame F2. The luminance analysis circuit 140 buffers the received image data IMA2 into a line buffer, an image memory, or the like, executes luminance analysis on the buffered image data IMA2, and outputs dimming data LLD2.

In the second frame F2, the light source control circuit 130 controls a luminance of the backlight 210 using the dimming data LLD1 calculated in the first frame F1. The luminance information calculation circuit 150 obtains a luminance of light reaching the target pixel 20 from the n×m light source elements using the dimming data LLD1 calculated in the first frame F1. The color correction circuit 160 executes color correction on the image data IMA2 on the second frame F2 using the obtained luminance. Similar processing is repeated for subsequent frames.

In the above embodiment, the circuit device 100 executes local dimming control on the display device 200. The display device 200 includes the backlight 210 including a plurality of two-dimensionally arranged light source elements, and the display panel 220. The circuit device 100 includes the luminance analysis circuit 140, the luminance information calculation circuit 150, and the color correction circuit 160. The luminance analysis circuit 140 executes luminance analysis on the image data IMA, and obtains dimming information for the local dimming control based on a result of the luminance analysis. The luminance information calculation circuit 150 calculates, based on the dimming information on n×m light source elements, luminance information indicating a luminance of light reaching the target pixel 20 from the n×m light source elements. Among the plurality of light source elements of the backlight 210, the n×m light source elements are arranged around the target pixel 20 for color correction in the local dimming control. Each of n and m is an integer of two or more and eight or less. The color correction circuit 160 executes color correction on image data of the target pixel 20 based on the luminance information, and outputs the image data IMB after the color correction to the display device 200.

According to the embodiment, not all the light source elements of the backlight 210 but a limited number of n×m light source elements are selected, and the luminance of the light reaching the target pixel 20 from the n×m light source elements is calculated. Accordingly, a calculation load can be reduced as compared with a case where a luminance is calculated in consideration of all the light source elements of the backlight 210. Due to the reduction in calculation load, for example, it is possible to execute the local dimming control using an ASIC or the like having a lower calculation processing capability than a microcomputer or the like.

In the embodiment, the luminance information calculation circuit 150 calculates the luminance information based on an attenuation characteristic of light reaching the display panel 220 from each of the n×m light source elements and distance information on a distance between each light source element and the target pixel.

As described with reference to FIG. 5, the attenuation characteristic indicates a relationship between the distance between the light source element and the target pixel 20, and an attenuation rate at the distance. According to the embodiment, the luminance information calculation circuit 150 can obtain an attenuation rate at the distance indicated by the distance information based on the attenuation characteristic and the distance information on the distance between each light source element and the target pixel, and calculate the luminance information based on the attenuation rate.

In the embodiment, the attenuation characteristic is a non-attenuation characteristic in a predetermined distance range from a position of the light source element.

According to the embodiment, a light source element actually having an area in a plan view can be regarded as a point light source located at a center of the light source element. The influence of the area of the light source element can be expressed by the non-attenuation characteristic within the predetermined distance range. Accordingly, since luminance calculation considering the area of the light source element is unnecessary, an algorithm for the luminance calculation can be simplified or a calculation load can be reduced.

Although the predetermined distance range is a circle having the radius La in FIG. 5, the predetermined distance range is not limited to an isotropic range and may be an anisotropic range. For example, when an anisotropic attenuation characteristic as in second and fourth embodiments are used, a predetermined anisotropic distance range can be defined in the anisotropic attenuation characteristic.

In the embodiment, the luminance information calculation circuit 150 calculates the luminance PIX_BL as the luminance information by the above equations (1) and (2).

According to the embodiment, a luminance of light reaching the target pixel 20 from each light source element is obtained using the function a indicating the attenuation characteristic, and the luminance is integrated for n×m light source elements. Accordingly, the luminance PIX_BL of the light reaching the target pixel 20 from the n×m light source elements can be calculated.

In the embodiment, the distance information includes the square Lij of the distance between each light source element and the target pixel 20.

In order to obtain the distance, it is necessary to obtain a sum of squares of a distance in the horizontal direction and a distance in the vertical direction and obtain a square root of the sum of squares. According to the embodiment, by using the square Lij of the distance as the distance information, calculation of the square root having a large processing load is unnecessary, and a processing load can be reduced.

In the embodiment, the attenuation characteristic is set based on a relationship between the distance information and an attenuation rate of the light reaching the display panel 220 from each light source element.

As shown in an equation (4), a luminance of the light reaching the display panel 220 from each light source element can be obtained by multiplying an attenuation rate β by an emission luminance of each light source element. Then, by integrating the luminance for the n×m light source elements, a luminance of the light reaching the target pixel 20 from the n×m light source elements can be calculated.

In the embodiment, the display device 200 includes the diffusion sheet 260. The diffusion sheet 260 is provided between the backlight 210 and the display panel 220 and diffuses light from the backlight 210. The attenuation characteristic is set based on the relationship between the distance information and the attenuation rate, and a diffusion characteristic of the diffusion sheet 260.

According to the embodiment, uniformity of the light incident on the display panel 220 is improved by providing the diffusion sheet 260. Unevenness remaining in the light with improved uniformity is reflected in the attenuation characteristic, and the luminance of the light reaching the target pixel 20 from the n×m light source elements can be calculated using the attenuation characteristic.

3. Second to Sixth Embodiments

Hereinafter, second to sixth embodiments will be described. In each embodiment, portions different from those according to the first embodiment will be mainly described, and description of the same portions as those according to the first embodiment will be omitted.

The second embodiment will be described. In α(Lij) in the above equation (2) and FIG. 5, the attenuation characteristic is an isotropic characteristic centered on coordinates of the light source element. In the second embodiment, the luminance information calculation circuit 150 obtains luminance information using an anisotropic attenuation characteristic centered on coordinates of a light source element.

Specifically, the luminance information calculation circuit 150 calculates the luminance PIX_BL by the following equation (3). In addition, θij is an angle between a line connecting the light source element LDij and the target pixel 20, and a reference line, and shows a direction of the target pixel 20 with respect to the light source element LDij. The reference line is, for example, a line parallel to the x direction or the y direction. In addition, α(Lij, θij) is a function with Lij and θij as variables, and indicates an attenuation rate of light reaching the target pixel 20 from the light source element LDij when a square of a distance is Lij and an angle is θij.

$$\text{PIX\_BL} = \sum_{j=1}^{m}\sum_{i=1}^{n}\text{LED\_BLij} \times \alpha(Lij, \Theta ij) \tag{3}$$

Next, the third embodiment will be described. The luminance information calculation circuit 150 uses a one-dimensional attenuation rate table as an attenuation characteristic. The one-dimensional attenuation rate table shows an isotropic attenuation characteristic centered on coordinates of a light source element.

FIG. 8 shows an example of the one-dimensional attenuation rate table. The attenuation rate table is a table in which a square of a distance between a light source element and the target pixel 20 is input and an attenuation rate corresponding to the input is output. The luminance information calculation circuit 150 refers to the attenuation rate table based on the square Lij of the distance shown in the above equation (1), obtains the attenuation rate β(Lij) corresponding to Lij, and calculates the luminance PIX_BL by the following equation (4).

$$\text{PIX\_BL} = \sum_{j=1}^{m}\sum_{i=1}^{n}\text{LED\_BLij} \times \beta(Lij) \tag{4}$$

The luminance information calculation circuit 150 may obtain the attenuation rate β(Lij) by linear interpolation. For example, Lij=6.25. The luminance information calculation circuit 150 selects squares 4 and 9 of two distances, adjacent above and below Lij=6.25, from squares of distances in the table, and acquires attenuation rates 0.95 and 0.85 corresponding thereto. The luminance information calculation circuit 150 obtains the attenuation rate β(Lij) at Lij=6.25 by linear interpolation using the acquired attenuation rates 0.95 and 0.85.

In the above embodiment, the luminance information calculation circuit 150 calculates the luminance information based on the distance information and a table in which the attenuation characteristic is associated with the distance information.

According to the embodiment, a luminance of the light reaching the display panel 220 from each light source element can be obtained using the distance information and the table in which the attenuation characteristic is associated with the distance information. Then, by integrating the luminance for the n×m light source elements, a luminance of the light reaching the target pixel 20 from the n×m light source elements can be calculated.

Next, the fourth embodiment will be described. The luminance information calculation circuit 150 uses a two-dimensional attenuation rate table as an attenuation characteristic. The two-dimensional attenuation rate table can show an anisotropic attenuation characteristic centered on coordinates of a light source element.

FIG. 9 shows an example of the two-dimensional attenuation rate table. Although an isotropic attenuation characteristic is shown here, an anisotropic attenuation characteristic may be used. The attenuation rate table is a table in which a distance in the horizontal direction and a distance in the vertical direction between a light source element and the target pixel 20 are input, and an attenuation rate corresponding to the input is output. The luminance information calculation circuit 150 refers to the attenuation rate table based on the distance uj in the horizontal direction and the distance vi in the vertical direction shown in FIG. 4, obtains an attenuation rate γ(uj, vi) corresponding to uj and vi, and calculates the luminance PIX_BL by the following equation (5).

$$\text{PIX\_BL} = \sum_{j=1}^{m}\sum_{i=1}^{n} \text{LED\_BLij} \times \gamma(uj, vi) \tag{5}$$

The luminance information calculation circuit 150 may obtain the attenuation rate γ(uj, vi) by linear interpolation. For example, uj=1.5 and vi=1.5. The luminance information calculation circuit 150 selects two distances 1 and 2 adjacent above and below uj=1.5 from distances in the horizontal direction in the table, and selects two distances 2 and 3 adjacent above and below vi=2.5 from distances in the vertical direction in the table. The luminance information calculation circuit 150 acquires attenuation rates 0.8, 0.6, 0.6, and 0.5 corresponding to (uj, vi)=(1, 2), (1, 3), (2, 2), and (2, 3). The luminance information calculation circuit 150 obtains the attenuation rate γ(uj, vi) at uj=1.5 and vi=1.5 by linear interpolation using the acquired attenuation rates 0.8, 0.6, 0.6, and 0.5.

In the above embodiment, distance information includes the horizontal distance uj in the horizontal direction between each light source element LDij of the n×m light source elements and the target pixel 20, and the vertical distance vi in the vertical direction between each light source element and the target pixel 20. The table is the two-dimensional table in which the attenuation characteristic is associated with the horizontal distance uj and the vertical distance vi.

According to the embodiment, a luminance of the light reaching the display panel 220 from each light source element can be obtained using the table in which the attenuation characteristic is associated with the horizontal distance uj and the vertical distance vi, and the horizontal distance uj and the vertical distance vi. Then, by integrating the luminance for the n×m light source elements, a luminance of the light reaching the target pixel 20 from the n×m light source elements can be calculated. By using the two-dimensional table, the luminance information can be calculated based on an anisotropic attenuation characteristic.

Next, the fifth embodiment will be described. The luminance information calculation circuit 150 selects 6×6 light source elements as the light source element group 15. An example in which n×m is not 4×4 is shown, and n may be two or more and eight or less and m may be two or more and eight or less as described above.

Figure 10:
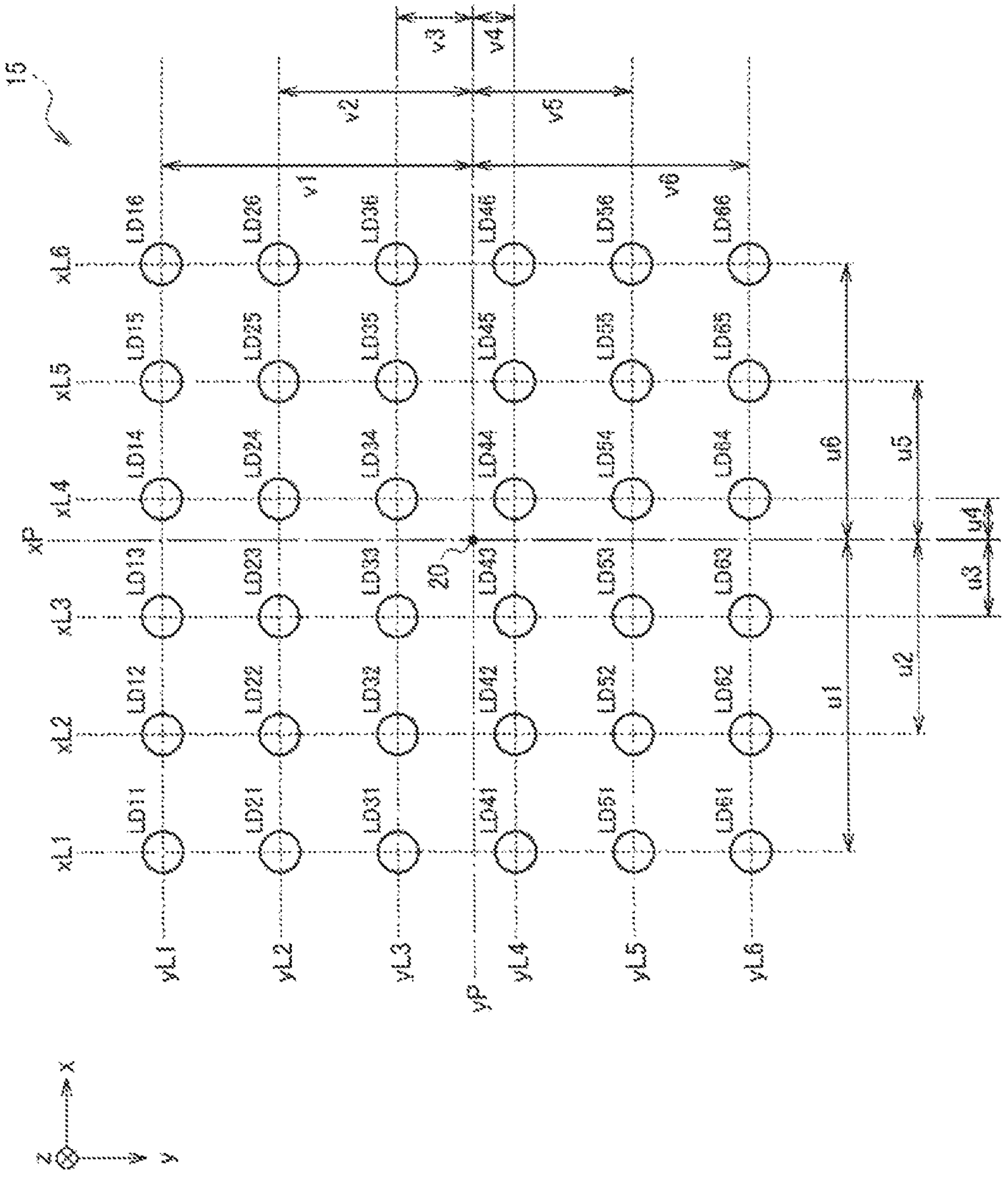
FIG. 10 is a diagram showing a distance between a target pixel and each light source element when 6×6 light source elements are selected.

FIG. 10 is a diagram showing a distance between a target pixel and each light source element when 6×6 light source elements are selected. Similarly to FIG. 4, among the 6×6 light source elements, the light source element in the i-th row and the j-th column is denoted by LDij, and the xy coordinates of the light source element LDij are denoted by (xLj, yLi). At this time, i is an integer of 1 or more and n=6 or less, and j is an integer of 1 or more and m=6 or less. The luminance PIX_BL of light reaching the target pixel 20 from each light source element may be calculated by any one of the calculation methods described in the first to fourth embodiments.

Next, the sixth embodiment will be described. In the sixth embodiment, a two-dimensional arrangement of the backlight 210 is a rhombus arrangement. The rhombus arrangement is also called a staggered arrangement.

Figure 11:
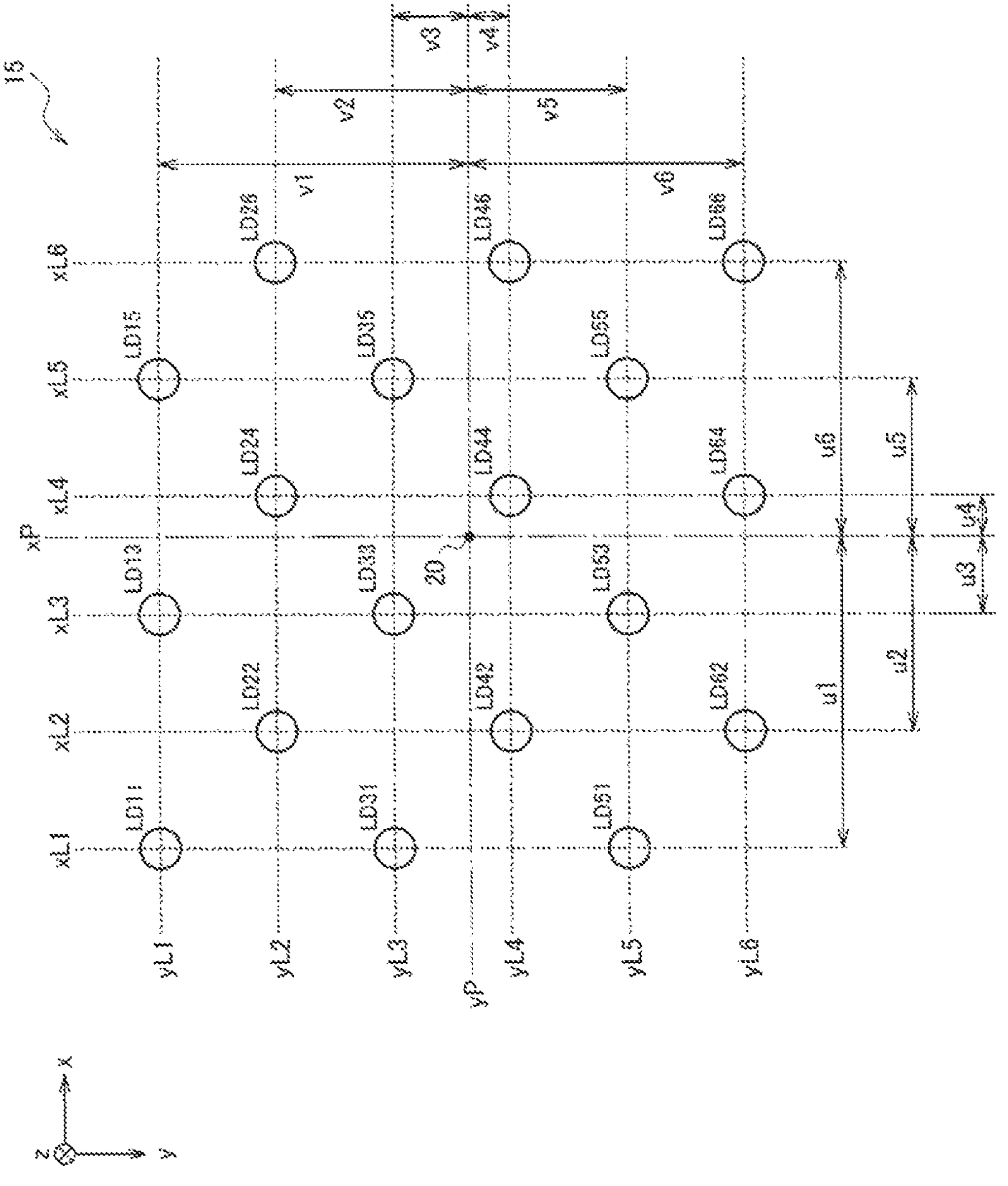
FIG. 11 is a diagram showing an example of a rhombus arrangement and a distance between a target pixel and each light source element in this case.

FIG. 11 is a diagram showing an example of the rhombus arrangement and a distance between a target pixel and each light source element in this case. The luminance information calculation circuit 150 assumes a square arrangement and selects s×t lattice points in the square arrangement. In FIG. 11, s=t=6, and light source elements are arranged at half of 6×6 lattice points. In FIG. 11, the light source elements LDij are arranged at lattice points where i and j are both odd numbers and lattice points where i and j are both even numbers. No light source elements are arranged at lattice points where i is odd and j is even, and where i is even and j is odd.

At this time, the luminance information calculation circuit 150 calculates the luminance PIX_BL of light reaching the target pixel 20 from each light source element assuming that the light source elements are virtually arranged at all of the 6×6 lattice points, the actually arranged light source elements are controlled based on the dimming data LLD, and the virtual light source elements not actually arranged are turned off. The luminance PIX_BL may be calculated by any one of the calculation methods described in the first to fourth embodiments.

In the example in FIG. 11, s×t=6×6, and the light source elements are arranged by a half number thereof, and the number of light source elements selected as the light source element group 15 is n×m=(6×6)/2=18. This can also be regarded as n×m=3×6 or n×m=6×3. In addition, s and t may be integers such that s×t is an integer larger than n×m.

A method of selecting n×m light source elements in the rhombus arrangement is not limited to the above. For example, in the backlight 210, light source elements are arranged in an odd intersection group including intersections of odd rows and odd columns and an even intersection group including intersections of even rows and even columns. At this time, the luminance information calculation circuit 150 selects p×q light source elements around the target pixel 20 from light source elements of the odd intersection group and p×q light source elements around the target pixel 20 from light source elements of the even intersection group. For example, when p×q=4×4, n×m=(4×4)×2=32. This can also be regarded as n×m=4×8 or n×m=8×4. In addition, p and q may be integers such that p×q is an integer smaller than n×m. The luminance information calculation circuit 150 calculates the luminance PIX_BL of light reaching the target pixel 20 from the selected n×m light source elements. The luminance PIX_BL may be calculated by any one of the calculation methods described in the first to fourth embodiments.

In the above embodiment, a plurality of light source elements 10 of the backlight 210 are arranged in a non-square lattice. At this time, the luminance information calculation circuit 150 calculates the luminance information assuming that s×t light source elements including the n×m light source elements are virtually arranged in an s×t square lattice. In addition, s and t are integers such that s×t is an integer larger than n×m.

According to the embodiment, even when an arrangement of the light source elements is not the square lattice, the luminance information calculation circuit 150 can calculate the luminance information using the same algorithm as an algorithm for calculating the luminance information when the arrangement of the light source elements is the square lattice.

In the embodiment, the luminance information calculation circuit 150 calculates the luminance information assuming that the n×m light source elements among the s×t light source elements are in a light-emitting state or a turn-off state based on the dimming information calculated by the luminance analysis circuit 140, and virtual light source elements other than the n×m light source elements among the s×t light source elements are in a turn-off state.

According to the embodiment, in the algorithm for calculating the luminance information when the arrangement of the light source elements is the square lattice, the luminance information calculation circuit 150 can calculate the luminance of the light reaching the display panel 220 from the n×m light source elements assuming that the virtual light source elements other than the n×m light source elements among the s×t light source elements are in a turn-off state.

A circuit device according to the embodiment described above executes local dimming control on a display device including a display panel and a backlight having a plurality of two-dimensionally arranged light source elements. The circuit device includes a luminance analysis circuit, a luminance information calculation circuit, and a color correction circuit. The luminance analysis circuit executes luminance analysis on image data, and obtains dimming information for the local dimming control based on a result of the luminance analysis. The luminance information calculation circuit calculates, based on the dimming information on n×m light source elements, luminance information indicating a luminance of light reaching a target pixel from the n×m light source elements. Among the plurality of light source elements, the n×m light source elements are arranged around the target pixel for color correction in the local dimming control. Each of n and m is an integer of two or more and eight or less. The color correction circuit executes color correction on image data on the target pixel based on the luminance information, and outputs the image data after the color correction to the display device.

According to the embodiment, not all the light source elements of the backlight but a limited number of n×m light source elements are selected, and the luminance of the light reaching the target pixel from the n×m light source elements is calculated. Accordingly, a calculation load can be reduced as compared with a case where a luminance is calculated in consideration of all the light source elements of the backlight.

In the embodiment, the luminance information calculation circuit may calculate the luminance information based on an attenuation characteristic of light reaching the display panel from each of the n×m light source elements and distance information on a distance between each light source element and the target pixel.

According to the embodiment, the luminance information calculation circuit can obtain an attenuation rate at the distance indicated by the distance information based on the attenuation characteristic of the light reaching the display panel from each light source element, and the distance information on the distance between each light source element and the target pixel, and calculate the luminance information based on the attenuation rate.

In the embodiment, the attenuation characteristic may be a non-attenuation characteristic in a predetermined distance range from a position of the light source element.

According to the embodiment, a light source element actually having an area in a plan view can be regarded as a point light source located at a center of the light source element. The influence of the area of the light source element can be expressed by the non-attenuation characteristic within the predetermined distance range. Accordingly, since luminance calculation considering the area of the light source element is unnecessary, an algorithm for the luminance calculation can be simplified or a calculation load can be reduced.

In the embodiment, a horizontal distance in a horizontal direction between a light source element in a j-th column among the n×m light source elements and the target pixel is uj, and j is an integer of one or more and m or less. A vertical distance in a vertical direction between a light source element in an i-th row among the n×m light source elements and the target pixel is vi, and i is an integer of one or more and n or less. An emission luminance of the light source element in the i-th row and the j-th column among the n×m light source elements is LED_BLij. A function indicating the attenuation characteristic is α. At this time, the luminance information calculation circuit may calculate the luminance PIX_BL as the luminance information by the above equations (1) and (2).

According to the embodiment, a luminance of light reaching the target pixel from each light source element is obtained using the function a indicating the attenuation characteristic, and the luminance is integrated for the n×m light source elements. Accordingly, the luminance PIX_BL of the light reaching the target pixel from the n×m light source elements can be calculated.

In the embodiment, the luminance information calculation circuit may calculate the luminance information based on the distance information and a table in which the attenuation characteristic is associated with the distance information.

According to the embodiment, a luminance of the light reaching the display panel from each light source element can be obtained using the distance information and the table in which the attenuation characteristic is associated with the distance information. Then, by integrating the luminance for the n×m light source elements, a luminance of the light reaching the target pixel from the n×m light source elements can be calculated.

In the embodiment, the distance information may include a horizontal distance in a horizontal direction between each of the n×m light source elements and the target pixel and a vertical distance in a vertical direction between each of the light source elements and the target pixel. The table may be a two-dimensional table in which the attenuation characteristic is associated with the horizontal distance and the vertical distance.

According to the embodiment, a luminance of the light reaching the display panel from each light source element can be obtained using the table in which the attenuation characteristic is associated with the horizontal distance and the vertical distance, and the horizontal distance and the vertical distance. Then, by integrating the luminance for the n×m light source elements, a luminance of the light reaching the target pixel from the n×m light source elements can be calculated. By using the two-dimensional table, the luminance information can be calculated based on an anisotropic attenuation characteristic.

In the embodiment, the distance information may include a square of the distance between each light source element and the target pixel.

In order to obtain the distance, it is necessary to obtain a sum of squares of a distance in the horizontal direction and a distance in the vertical direction and obtain a square root of the sum of squares. According to the embodiment, by using the square of the distance as the distance information, calculation of the square root having a large processing load is unnecessary, and a processing load can be reduced.

In the embodiment, the attenuation characteristic may be set based on a relationship between the distance information and an attenuation rate of the light reaching the display panel from each light source element.

A luminance of the light reaching the display panel from each light source element can be obtained by multiplying the attenuation rate by an emission luminance of each light source element. Then, by integrating the luminance for the n×m light source elements, a luminance of the light reaching the target pixel from the n×m light source elements can be calculated.

In the embodiment, the display device may include a diffusion sheet. The diffusion sheet may be provided between the backlight and the display panel and configured to diffuse light from the backlight. The attenuation characteristic may be set based on the relationship between the distance information and the attenuation rate, and a diffusion characteristic of the diffusion sheet.

According to the embodiment, uniformity of the light incident on the display panel is improved by providing the diffusion sheet. Unevenness remaining in the light with improved uniformity is reflected in the attenuation characteristic, and the luminance of the light reaching the target pixel from the n×m light source elements can be calculated using the attenuation characteristic.

In the embodiment, the plurality of light source elements of the backlight may be arranged in a non-square lattice. At this time, the luminance information calculation circuit may calculate the luminance information assuming that s×t light source elements including the n×m light source elements are virtually arranged in an s×t square lattice. In addition, s and t may be integers such that s×t is an integer larger than n×m.

According to the embodiment, even when an arrangement of the light source elements is not the square lattice, the luminance information calculation circuit can calculate the luminance information using the same algorithm as an algorithm for calculating the luminance information when the arrangement of the light source elements is the square lattice.

In the embodiment, the luminance information calculation circuit may calculate the luminance information assuming that n×m light source elements among the s×t light source elements are in a light-emitting state or a turn-off state based on the dimming information calculated by the luminance analysis circuit, and virtual light source elements other than the n×m light source elements among the s×t light source elements are in a turn-off state.

According to the embodiment, in the algorithm for calculating the luminance information when the arrangement of the light source elements is the square lattice, the luminance information calculation circuit can calculate the luminance of the light reaching the display panel from the n×m light source elements assuming that the virtual light source elements other than the n×m light source elements among the s×t light source elements are in a turn-off state.

A display system according to the embodiment includes the circuit device and the display device described above.

Although the embodiments have been described in detail above, it will be easily understood by those skilled in the art that many modifications can be made without substantially departing from the novel matters and effects according to the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. All combinations of the embodiments and the modifications are also included in the scope of the present disclosure. Configurations, operations, and the like of the circuit device, the backlight, the display device, the display system, the processing device, the electronic apparatus, and the like are not limited to those described in the embodiments, and various modifications can be made.

What is claimed is:

1. A circuit device that executes local dimming control on a display device including a display panel and a backlight having a plurality of two-dimensionally arranged light source elements, the circuit device comprising:

a luminance analysis circuit configured to execute luminance analysis on image data and obtain dimming information for the local dimming control based on a result of the luminance analysis;

a luminance information calculation circuit configured to calculate, based on the dimming information on n×m light source elements arranged around a target pixel for color correction in the local dimming control among the plurality of light source elements, each of n and m being an integer of two or more and eight or less, luminance information indicating a luminance of light reaching the target pixel from the n×m light source elements; and a color correction circuit configured to execute color correction on image data on the target pixel based on the luminance information and output the image data after the color correction to the display device, wherein the luminance information calculation circuit calculates the luminance information based on an attenuation characteristic of light reaching the display panel from each of the n×m light source elements and distance information on a distance between each of the light source elements and the target pixel, and the attenuation characteristic is a non-attenuation characteristic in a predetermined distance range from a position of the light source element.

2. The circuit device according to claim 1 wherein when a horizontal distance in a horizontal direction between a light source element in a j-th column among the n×m light source elements and the target pixel is uj, j being an integer of one or more and m or less, a vertical distance in a vertical direction between a light source element in an i-th row among the n×m light source elements and the target pixel is vi, i being an integer of one or more and n or less, an emission luminance of the light source element in the i-th row and the j-th column among the n×m light source elements is LED_BLij, and a function indicating the attenuation characteristic is $\alpha$, the luminance information calculation circuit calculates a luminance PIX_BL as the luminance information by an equation (1) and an equation (2)

$$Lij = ui^2 + vi^2 \quad (1)$$

$$PIX\_BL = \sum_{j=1}^{m}\sum_{i=1}^{n} LED\_BLij \times \alpha(Lij). \quad (2)$$

3. The circuit device according to claim 1 wherein the luminance information calculation circuit calculates the luminance information based on the distance information and a table in which the attenuation characteristic is associated with the distance information.

4. The circuit device according to claim 3, wherein the distance information includes a horizontal distance in a horizontal direction between each of the n×m light source elements and the target pixel and a vertical distance in a vertical direction between each of the light source elements and the target pixel, and the table is a two-dimensional table in which the attenuation characteristic is associated with the horizontal distance and the vertical distance.

5. The circuit device according to claim 1 wherein the distance information includes a square of the distance between each of the light source elements and the target pixel.

6. The circuit device according to claim 1 wherein the attenuation characteristic is set based on a relationship between the distance information and an attenuation rate of the light reaching the display panel from each of the light source elements.

7. The circuit device according to claim 6, wherein the display device includes a diffusion sheet provided between the backlight and the display panel and configured to diffuse light from the backlight, and the attenuation characteristic is set based on the relationship between the distance information and the attenuation rate, and a diffusion characteristic of the diffusion sheet.

8. The circuit device according to claim 1, wherein when the plurality of light source elements of the backlight are arranged in a non-square lattice, the luminance information calculation circuit calculates the luminance information assuming that s×t light source elements including the n×m light source element are virtually arranged in an s×t square lattice, s and t being integers such that s×t is an integer larger than n×m.

9. The circuit device according to claim 8, wherein the luminance information calculation circuit calculates the luminance information assuming that the n×m light source elements among the s×t light source elements are in a light-emitting state or a turn-off state based on the dimming information calculated by the luminance analysis circuit, and virtual light source elements other than the n×m light source elements among the s×t light source elements are in a turn-off state.

10. A display system comprising:

the circuit device according to claim 1; and the display device.

11. A circuit device that executes local dimming control on a display device including a display panel and a backlight having a plurality of two-dimensionally arranged light source elements, the circuit device comprising:

a luminance analysis circuit configured to execute luminance analysis on image data and obtain dimming information for the local dimming control based on a result of the luminance analysis;

a luminance information calculation circuit configured to calculate, based on the dimming information on n×m light source elements arranged around a target pixel for color correction in the local dimming control among the plurality of light source elements, each of n and m being an integer of two or more and eight or less, luminance information indicating a luminance of light reaching the target pixel from the n×m light source elements; and a color correction circuit configured to execute color correction on image data on the target pixel based on the luminance information and output the image data after the color correction to the display device, wherein the luminance information calculation circuit calculates the luminance information based on an attenuation characteristic of light reaching the display panel from each of the n×m light source elements and distance information on a distance between each of the light source elements and the target pixel, and the luminance information calculation circuit calculates the luminance information based on the distance information and a table in which the attenuation characteristic is associated with the distance information.

12. A circuit device that executes local dimming control on a display device including a display panel and a backlight having a plurality of two-dimensionally arranged light source elements, the circuit device comprising:

a luminance analysis circuit configured to execute luminance analysis on image data and obtain dimming information for the local dimming control based on a result of the luminance analysis;

a luminance information calculation circuit configured to calculate, based on the dimming information on n×m light source elements arranged around a target pixel for color correction in the local dimming control among the plurality of light source elements, each of n and m being an integer of two or more and eight or less, luminance information indicating a luminance of light reaching the target pixel from the n×m light source elements; and a color correction circuit configured to execute color correction on image data on the target pixel based on the luminance information and output the image data after the color correction to the display device, wherein, when the plurality of light source elements of the backlight are arranged in a non-square lattice, the luminance information calculation circuit calculates the luminance information assuming that s×t light source elements including the n×m light source element are virtually arranged in an s×t square lattice, s and t being integers such that s×t is an integer larger than n×m.

* * * * *